HILES & DANNER.
Straw Cutter.
No. 80,175.  Patented July 21, 1868.
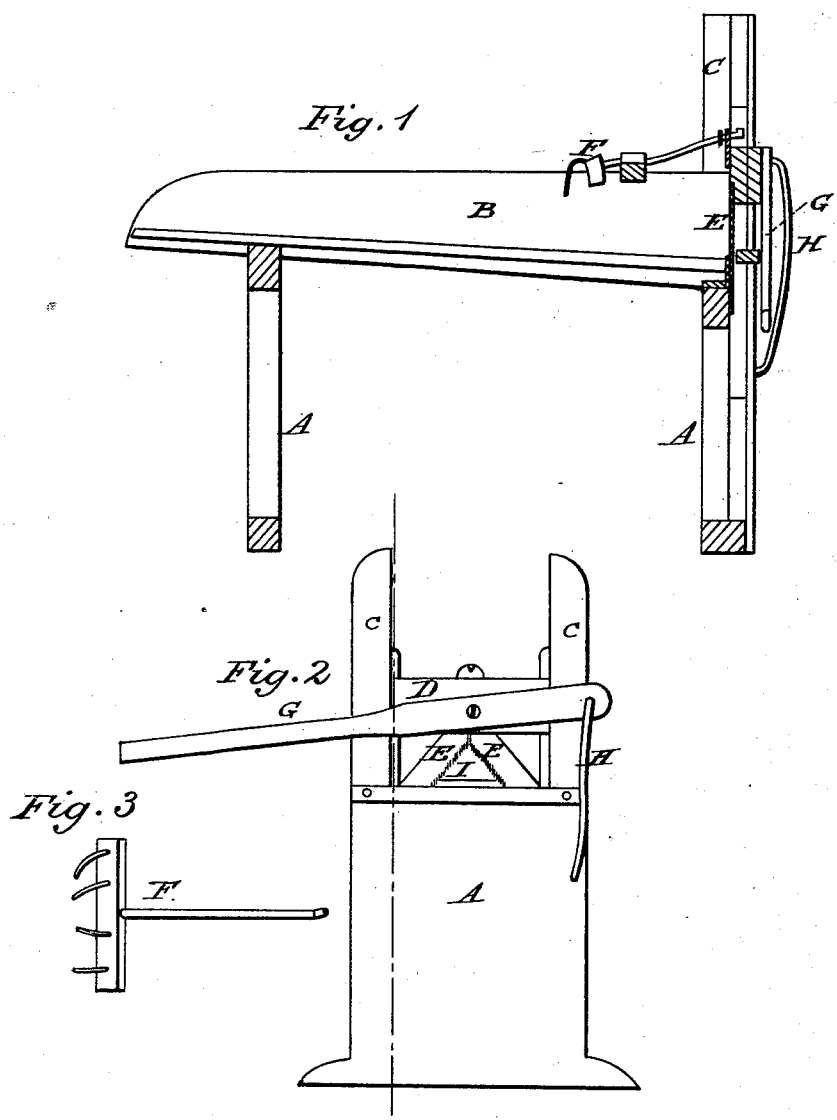

United States Patent Office.

S. B. HILES AND J. B. DANNER, OF SALTILLOVILLE, INDIANA.

Letters Patent No. 80,175, dated July 21, 1868.

IMPROVEMENT IN STRAW-CUTTER.

*The Schedule referred to in these Letters Patent and making part of the same.*

TO ALL WHOM IT MAY CONCERN:

Be it known that we, S. B. HILES and J. B. DANNER, of Saltilloville, in the county of Washington, and in the State of Indiana, have invented certain new and useful Improvements in Straw-Cutters; and do hereby declare that the following is a full, clear, and exact description thereof, reference being made to the accompanying drawings, and to the letters of reference marked thereon.

In the annexed drawings, forming part of this specification—

Figure 1 is a side view, and

Figure 2 a front view of the straw-cutter.

Figure 3 is a top view of the self-feeding rake.

A represents the frame on which the box B rests. This frame has two upright posts C, which are grooved, and in which grooves the frame D, with the obliquely-placed cutting-knives E E, serrated on their cutting-edges, slides up and down. At the top of the frame D, the handle to the rake F passes in such a manner that, when the frame is raised, the rake is turned down into the straw in the box B, and drags it forward, and when the frame D is lowered, the rake is raised and moved back. The frame D is raised and lowered by means of the lever G, fastened to a rod, H, which rod is attached to the frame A. At the front part of the box B is a horizontally-placed knife, I. This knife I is stationary, and the other knives E E run close to it, and in conjunction with it cut the straw when the frame D descends.

We do not claim the self-acting rake, nor do we claim a U-shaped cutting-knife in a sliding frame, operated by a lever.

What we do claim is—

The combination of the obliquely-placed serrated knives E E in the sliding frame D, with the horizontal stationary knife I, in the frame A, and the rake F, all constructed and operating as shown and described.

In testimony that we claim the foregoing, we have hereunto set our hands, this 4th day of April, 1868.

S. B. HILES,
J. B. DANNER.

Witnesses:
EDMUND T. CHERTAIN,
JOSHUA LARKIN.